(12) United States Patent
Buscema et al.

(10) Patent No.: US 12,385,600 B2
(45) Date of Patent: Aug. 12, 2025

(54) SUPPORT APPARATUS FOR SECURING A PORTABLE ELECTRONIC DEVICE

(71) Applicant: SAFE Structure Designs, LLC, Las Vegas, NV (US)

(72) Inventors: John Buscema, New Port Richey, FL (US); Jonathan Ziegler, Wofford Heights, CA (US)

(73) Assignee: SAFE Structure Designs, LLC, Las Vegas, NV (US)

( * ) Notice: Subject to any disclaimer, the term of this patent is extended or adjusted under 35 U.S.C. 154(b) by 52 days.

(21) Appl. No.: 18/385,902

(22) Filed: Oct. 31, 2023

(65) Prior Publication Data

US 2024/0142051 A1 May 2, 2024

Related U.S. Application Data

(60) Provisional application No. 63/421,006, filed on Oct. 31, 2022.

(51) Int. Cl.
*F16M 13/02* (2006.01)
*F16M 11/10* (2006.01)

(52) U.S. Cl.
CPC .......... *F16M 13/022* (2013.01); *F16M 11/10* (2013.01); *F16M 2200/021* (2013.01)

(58) Field of Classification Search
CPC . F16M 13/022; F16M 11/10; F16M 2200/021
USPC ............................................ 248/176.1, 178.1
See application file for complete search history.

(56) References Cited

U.S. PATENT DOCUMENTS

| | | | | |
|---|---|---|---|---|
| 4,154,381 A | * | 5/1979 | Zufich | A45F 3/08 D3/216 |
| 5,472,164 A | | 12/1995 | Contee | |
| 5,732,867 A | * | 3/1998 | Perkins | A45F 3/08 224/628 |
| 5,774,338 A | * | 6/1998 | Wessling, III | G06F 1/163 361/733 |
| 6,507,486 B2 | * | 1/2003 | Peterson, III | G06F 1/163 361/730 |
| 6,522,531 B1 | * | 2/2003 | Quintana | G06F 1/163 361/679.09 |

(Continued)

*Primary Examiner* — Monica E Millner
(74) *Attorney, Agent, or Firm* — Lippes Mathias LLP; Mitchell Ghaneie; Josephine Chen

(57) ABSTRACT

A support apparatus for securing a portable electronic device includes a backer plate, a plurality of coupling devices, a power supply tray, a pivotable bracket assembly, a pair of stiffening plates, a pivot axis rod, a locking feature, and a securement strap. The plurality of coupling devices couple to the backer plate and can be coupled to one or more existing structural support elements. The power supply tray secures a stationary power supply electrically coupled to the portable electronic device. The pivotable bracket assembly secures and enables rotation of the portable electronic device. The pivot axis rod pivotally connects to the pivotable bracket assembly, and rigidly connects to the opposing stiffening plates. The locking feature selectively retains the pivotable bracket assembly in an upright vertical position. The securement strap couples the front of the pivotable bracket assembly to the backer plate while securing the top of the portable electronic device.

20 Claims, 19 Drawing Sheets

(56) References Cited

U.S. PATENT DOCUMENTS

| | | | | |
|---|---|---|---|---|
| 6,529,372 B1* | 3/2003 | Ng | ............ | G06F 1/163 |
| | | | | 361/728 |
| 6,932,256 B2* | 8/2005 | Hale | ............ | A45F 3/042 |
| | | | | 224/648 |
| 6,962,277 B2* | 11/2005 | Quintana | ............ | G06F 1/163 |
| | | | | 709/201 |
| 7,265,970 B2* | 9/2007 | Jordan | ............ | G09F 21/02 |
| | | | | 361/679.27 |
| 8,079,503 B1* | 12/2011 | Yeates | ............ | A45C 7/0086 |
| | | | | 224/268 |
| 8,104,653 B1* | 1/2012 | Leung | ............ | A45F 3/04 |
| | | | | 224/636 |
| 8,413,938 B2 | 4/2013 | Whelan et al. | | |
| 8,505,790 B2* | 8/2013 | Yu | ............ | F16M 11/041 |
| | | | | 224/625 |
| 8,584,917 B2* | 11/2013 | Hexels | ............ | A45F 3/14 |
| | | | | 2/2.5 |
| 9,777,997 B2* | 10/2017 | Swan | ............ | A41D 13/0518 |
| 9,820,556 B2* | 11/2017 | Adams | ............ | A45F 3/08 |
| 10,007,303 B1* | 6/2018 | Wang | ............ | A63F 13/98 |
| 10,413,044 B2* | 9/2019 | Husband | ............ | A45F 3/04 |
| 10,617,209 B1 | 4/2020 | Frost | | |
| 10,754,380 B2* | 8/2020 | Pennington, Jr. | ............ | G06F 1/163 |
| 11,089,859 B2* | 8/2021 | Nordmann | ............ | A45F 3/08 |
| 2010/0032464 A1* | 2/2010 | Gleason, Jr. | ............ | A45F 3/047 |
| | | | | 224/628 |
| 2020/0055527 A1 | 2/2020 | Evans et al. | | |

\* cited by examiner

SUPPORT APPARATUS FOR SECURING A PORTABLE ELECTRONIC DEVICE

CROSS-REFERENCE TO RELATED APPLICATION

This application claims the benefit of U.S. Provisional Application No. 63/421,006, filed Oct. 31, 2022, and is hereby incorporated by reference in its entirety for all purposes.

FIELD OF THE INVENTION

The present disclosure relates generally to a support apparatus designed to secure a portable electronic device and pertains specifically to a support apparatus having a pivotable bracket assembly configured for securing a portable electronic device and further including a plurality of coupling devices for coupling the support apparatus to existing structural support elements.

BACKGROUND

Traditionally, large portable electronic devices are stored in known wearable container assemblies which allow such devices to be transportable. However, having the user support the heavy load imparted by the weight of the portable electronic device in the wearable container assembly while they're walking can cause the user to become fatigued over time. Accordingly, a support apparatus is needed to transfer the load off the user and onto existing stationary structural support elements during times when transporting the electronic device is not necessary.

There are known separate mounting kits available which include fixtures that function as hooks or adjustable clamps, and which are configured to be coupled to structural support elements such as railings, for example. These known separate mounting kits need to be stored and transported by the user as well, removed from their storage unit, and fastened to the railing. Then the user can remove their container assemblies and couple them to the installed mounting fixtures. There is a need for a support apparatus having a plurality of coupling devices pre-mounted to the rear of the support apparatus, and configured for coupling to existing structural elements such as, but not limited to, railing, posts, walls, beams or columns.

Additionally, some large portable electronic devices require the securing of adjacent stationary external power supplies, as well as other compartments for securement of various adjacent auxiliary devices. There is a need for a support apparatus with separate compartments or trays configured for securing adjacent auxiliary devices used in conjunction with the portable electronic devices.

Further, there is a need for a user to have convenient access to insert as well as pick up the portable electronic device from the support apparatus without having to detach it from its wearable container assembly. As such, there is a need for a support apparatus with a pivotable bracket tray configured for securing the electronic device and for providing convenient access to the device.

SUMMARY OF THE INVENTION

A non-limiting exemplary embodiment (the "exemplary embodiment") of a support apparatus for securing a portable electronic device is disclosed herein. The exemplary embodiment of the support apparatus includes a backer plate, a plurality of coupling devices, a power supply tray, a pivotable bracket assembly, a pair of stiffening plates, a pivot axis rod, a locking feature, and a securement strap. The backer plate includes a front surface and a rear surface. The plurality of coupling devices are coupled to the rear surface of the backer plate and are configured for coupling the support apparatus to one or more existing structural support elements. The power supply tray is coupled to the backer plate and is configured to secure a stationary power supply which may be electrically coupled to the portable electronic device. The pivotable bracket assembly is configured for securing the portable electronic device, and for enabling rotation of the portable electronic device from an upright vertical position down to an inclined position. The stiffening plates are configured to couple to the backer plate and are disposed each on opposing sides of the pivotable bracket assembly. The pivot axis rod is configured for pivotal connection to the pivotable bracket assembly, and for rigid connection to the opposing stiffening plates. The locking feature is configured to selectively retain the pivotable bracket assembly in the upright vertical position by selectively preventing the pivotable bracket assembly from rotating about the pivotal axis rod forward and down to the inclined position. The securement strap is configured to couple the front of the pivotable bracket assembly to the backer plate while securing the top of the portable electronic device.

Another embodiment of the support apparatus includes a backer plate, a plurality of coupling devices, a power supply tray, a pivotable bracket assembly, a pair of stiffening plates, a pivot axis rod, a locking feature, and a securement strap. The backer plate includes a front surface and a rear surface. The plurality of coupling devices are coupled to the rear surface of the backer plate and are configured for coupling the support apparatus to one or more existing structural support elements. The plurality of coupling devices are also interchangeable depending on the geometry of the one or more existing structural support elements. The power supply tray is coupled to the backer plate and is configured to secure a stationary power supply which may be electrically coupled to the portable electronic device. The pivotable bracket assembly is configured for securing the portable electronic device, and for enabling rotation of the portable electronic device from an upright vertical position down to an inclined position. The stiffening plates are configured to couple to the backer plate and are disposed each on opposing sides of the pivotable bracket assembly. The pivot axis rod is configured for pivotal connection to the pivotable bracket assembly, and for rigid connection to the opposing stiffening plates. The locking feature is configured to selectively retain the pivotable bracket assembly in the upright vertical position by selectively preventing the pivotable bracket assembly from rotating about the pivotal axis rod forward and down to the inclined position. The securement strap is adjustable and configured to couple the front of the pivotable bracket assembly to the backer plate while securing the top of the portable electronic device.

A further embodiment of the support apparatus includes a backer plate, a plurality of coupling devices, a power supply tray, a pivotable bracket assembly, a pair of stiffening plates, a pivot axis rod, a locking feature, a securement strap, and a stabilizer. The backer plate includes a front surface and a rear surface. The plurality of coupling devices are coupled to the rear surface of the backer plate and are configured for coupling the support apparatus to one or more existing structural support elements. The power supply tray is coupled to the backer plate and is configured to secure a stationary power supply which may be electrically coupled to the portable electronic device. The pivotable bracket assembly is configured for securing the portable electronic device, and for enabling rotation of the portable electronic device from an upright vertical position down to an inclined position. The stiffening plates are configured to couple to the backer plate and are disposed each on opposing sides of the pivotable bracket assembly. The pivot axis rod is configured for pivotal connection to the pivotable bracket assembly, and for rigid connection to the opposing stiffening plates. The locking feature is configured to selectively retain the pivotable bracket assembly in the upright vertical position by selectively preventing the pivotable bracket assembly from rotating about the pivotal axis rod forward and down to the inclined position. The securement strap is configured to couple the front of the pivotable bracket assembly to the backer plate while securing the top of the portable electronic device. The stabilizer is configured to mechanically link between the pivotable bracket assembly and the backer plate, and to restrict the rate at which the pivotable bracket assembly is capable of rotating.

BRIEF DESCRIPTION OF THE DRAWINGS

The appended figures merely illustrate an exemplary embodiment of the present disclosure and cannot be considered as limiting its scope.

NUMBER REFERENCES

1—Support apparatus
2—Portable electronic device
4—Stationary power supply
10—Backer plate
12—Top coupling devices
13—Bottom coupling devices
14—Power supply tray
15—Rear member
16—Tabs
17—Side walls
18—Top brace
19—Bottom brace
20—Stiffening plates
22—Bottom wall
24—Mounting protrusions
26—Mounting brackets
30—Pivotable bracket assembly
32—Front plate
34—Rear plate
36—Base plate
37—Aperture
38—Intermediate brace
40—Mounting block
41—Rear compartment
42—Securement strap
43—Clip
44—Spacer brace
45—Compressible pad
46—Bearing Pad
47—Cutout
48—Protrusions
50—Stabilizer
60—Pivot axis rod
62—Locking feature
70—Auxiliary compartment
72—Strap
74—Supplemental power supply units
76—Auxiliary screen support
78—Display device

DETAILED DESCRIPTION

In the following description, reference is made to the accompanying drawings which form a part hereof and which illustrate an embodiment of the present disclosure. It is understood that other embodiments may be utilized, and structural and operational changes may be made without departing from the scope of the present disclosure.

Figure 2:
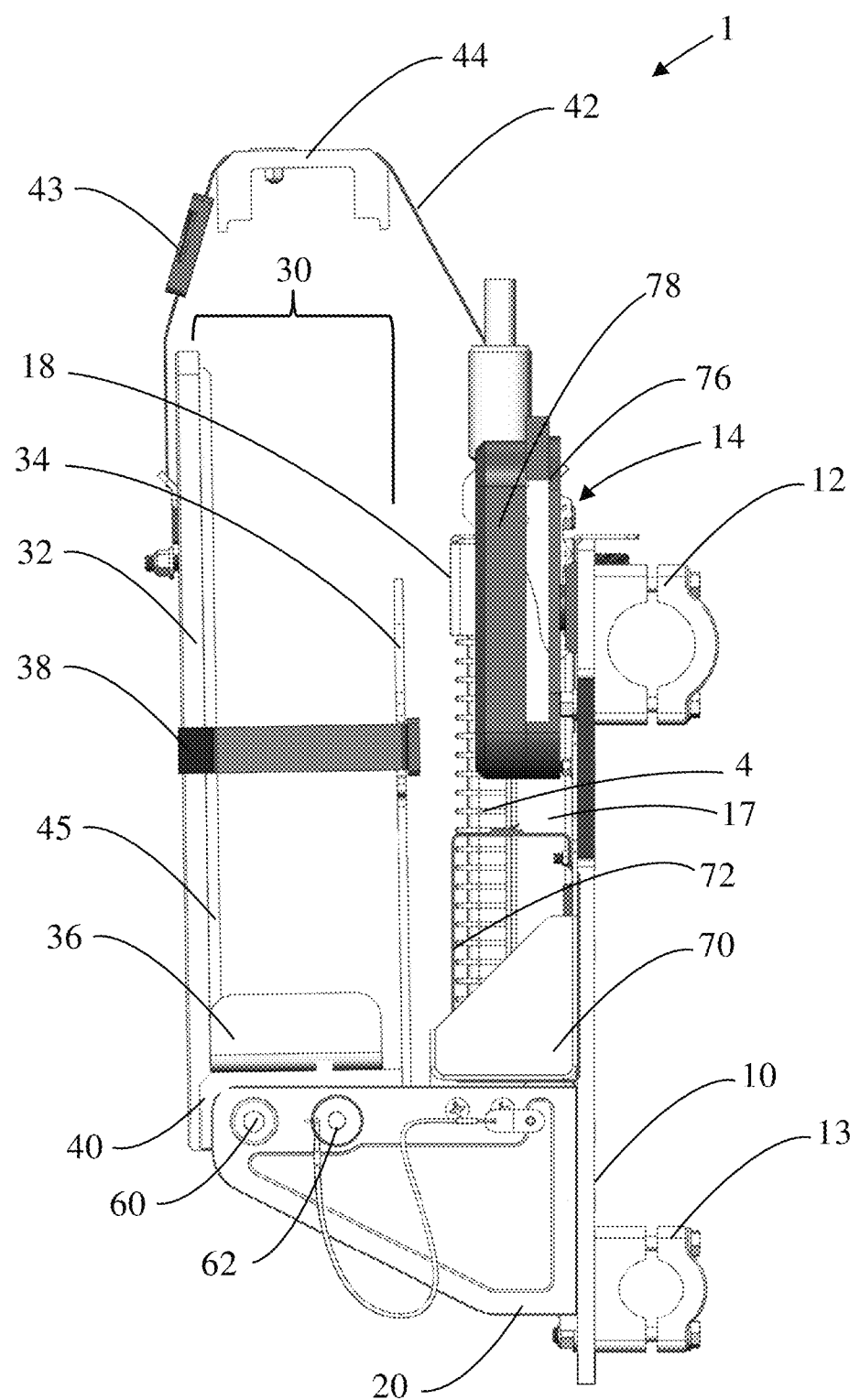
FIG. 2 is a right-side elevation view of the of the support apparatus of FIG. 1 without the stabilizer showing, further depicting an exemplary embodiment of a power supply unit secured in a rear storage compartment and a display device in an auxiliary screen support.
Figure 3:
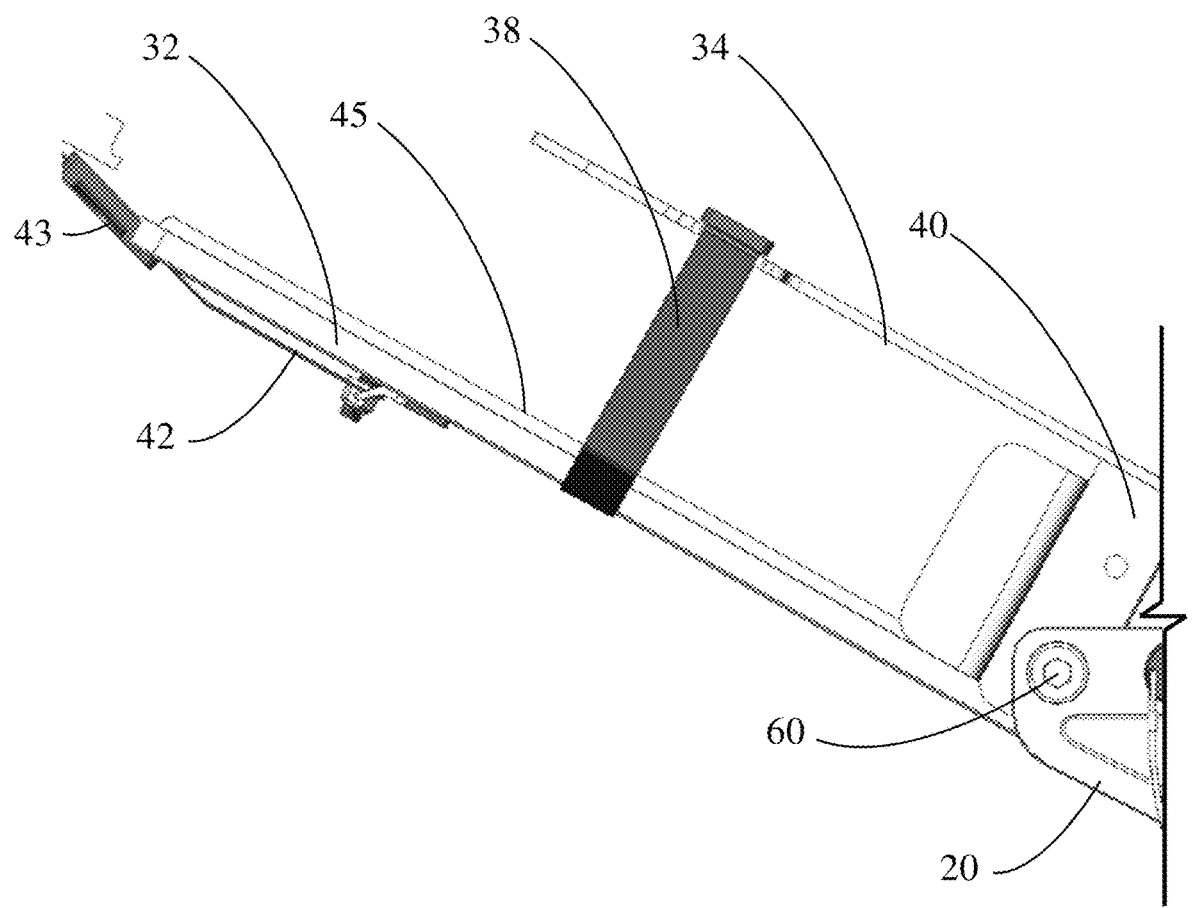
FIG. 3 is a partial right-side view of a pivotable bracket assembly shown rotated into an inclined position.
Figure 4:
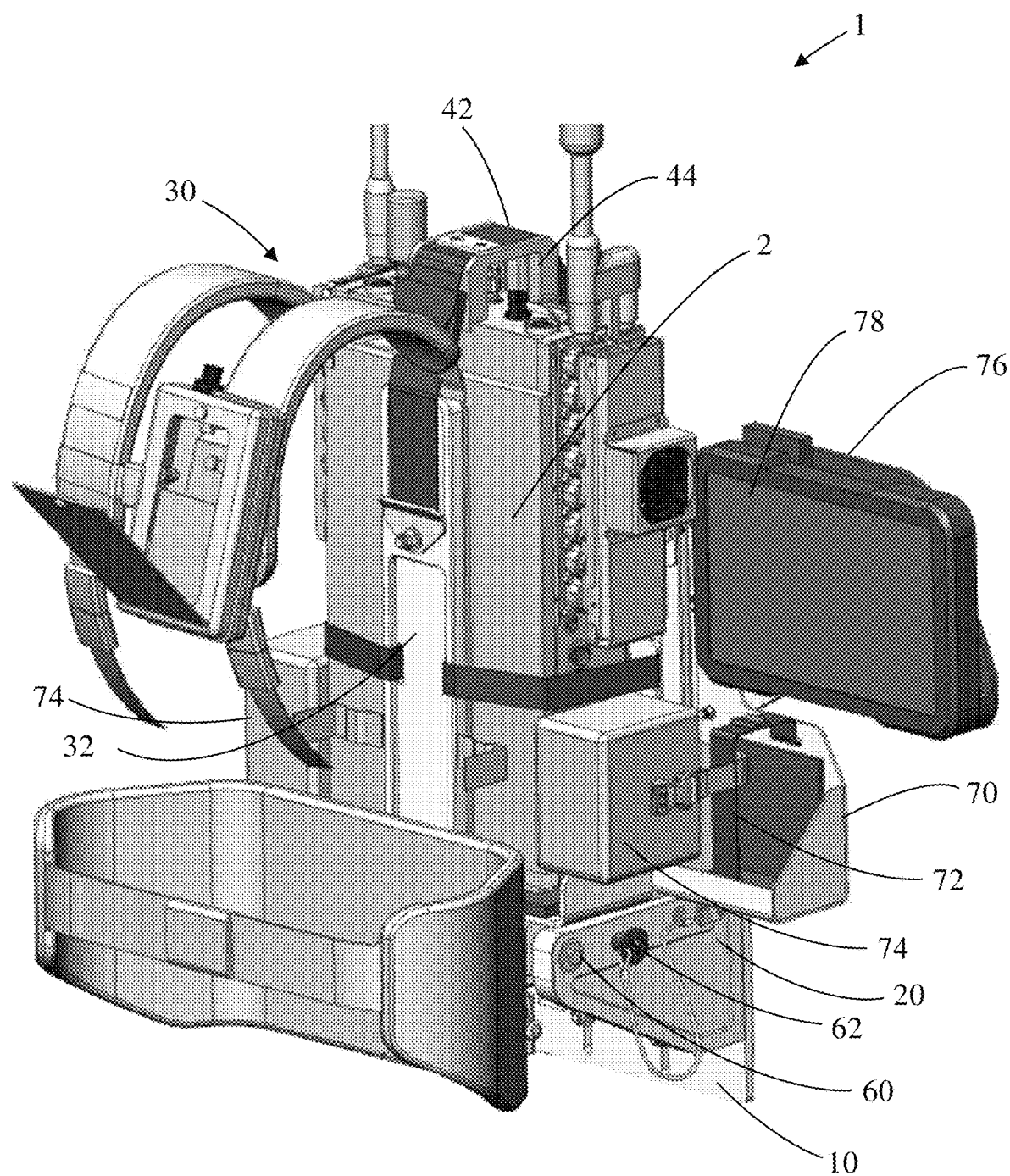
FIG. 4 is a right front perspective view of the support apparatus of FIG. 1 further depicting an in-use exemplary embodiment of a portable electronic device secured in a pivotable bracket assembly, and additionally depicting an associated wearable container assembly.

As shown in FIGS. 1-10, the present disclosure provides an exemplary, non-limiting embodiment of a support apparatus 1 for securing a portable electronic device 2 (electronic device is shown in FIG. 4). The support apparatus 1 generally includes a backer plate 10, a plurality of coupling devices (such as, for example, top and bottom coupling devices 12, 13), a power supply tray 14, a pair of stiffening plates 20, a pivotable bracket assembly 30, a securement strap 42, a pivot axis rod 60, and a locking feature 62.

Figure 1:
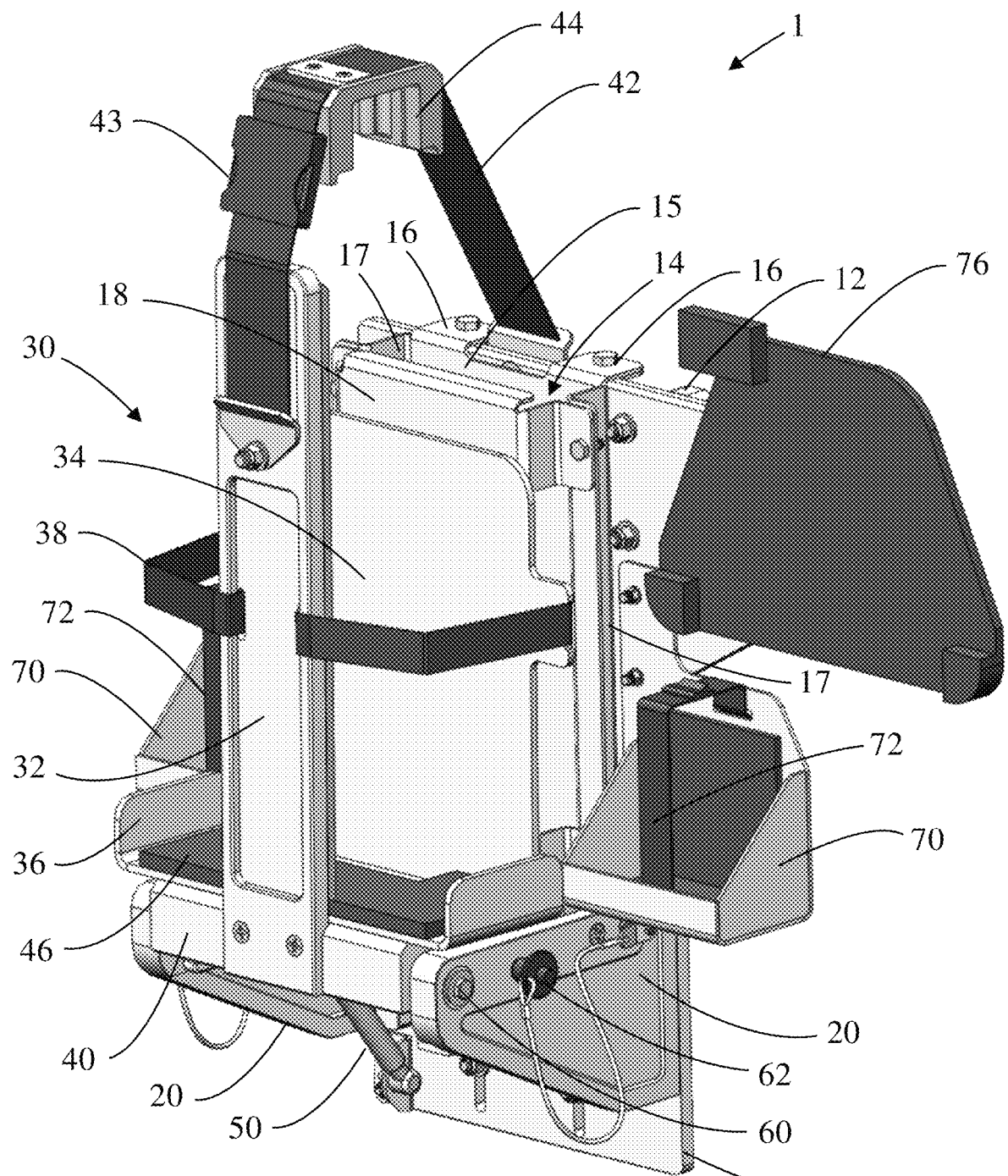
FIG. 1 is a right front perspective view of an exemplary, non-limiting embodiment of a support apparatus.

The pivotable bracket assembly 30 is configured for securing a portable electronic device 2, and for enabling rotation of the portable electronic device from an upright vertical position, as shown in FIG. 1, forward and down to an inclined position, as shown in FIG. 3. The portable electronic device 2 may be any suitable portable electronic device, such as, for example, an electronic frequency jamming device. The portable electronic device 2 may be electrically coupled to a stationary power supply 4 (power supply is shown in FIG. 2) when the portable electronic device is stored within the pivotable bracket assembly 30. The stationary power supply 4 may be any suitable stationary power supply, such as, for example, an AC/DC converter or a DC power supply. The stationary power supply 4 is secured within the power supply tray 14 (the tray is shown in FIGS. 1, 2, 5, 8B, 13 (top of tray) and 16, 17 and 20 (bottom of tray)).

The backer plate 10 is preferably constructed of a rigid material and includes a front and rear surface. A plurality of coupling devices, such as top coupling devices 12 and bottom coupling devices 13 attach to the rear surface of the backer plate 10, as shown in FIGS. 2, 6, 10-15, 18 and 19. The top and bottom coupling devices 12, 13, are configured for coupling to one or more existing structural elements such as, but not limited to, railing, posts, walls, beams or columns. The top and bottom coupling devices 12, 13, are any type of suitable coupling device, such as hooks or clamps. At least one of the plurality of top and bottom coupling devices 12, 13, is configured to be translationally adjustable. In one aspect, the top coupling devices 12 are configured to couple to a first cylindrical railing member and the bottom coupling devices 13 are configured to couple to a second cylindrical railing member, wherein the first cylindrical railing member has a larger diameter than the second cylindrical railing member. It is anticipated that the number, layout, type, and size of the plurality of coupling devices can vary to accommodate a variety of structural elements which the support apparatus 1 may be configured to attach to. Further, the plurality of coupling devices are interchangeable depending on the geometry of the one or more existing structural support elements.

Figure 16:
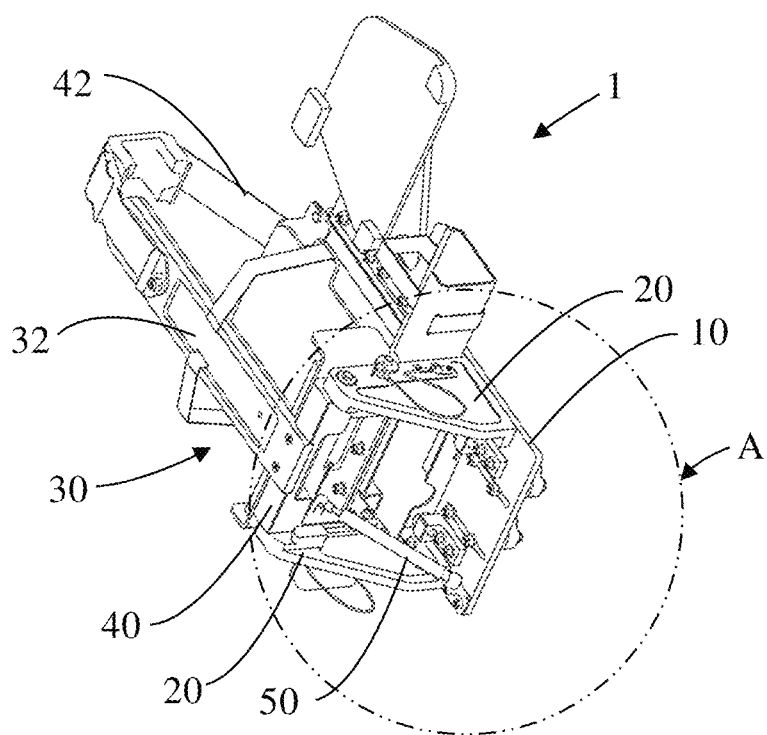
FIG. 16 is a second bottom perspective view of the support apparatus of FIG. 5, rotated slightly counter-clockwise.
Figure 17:
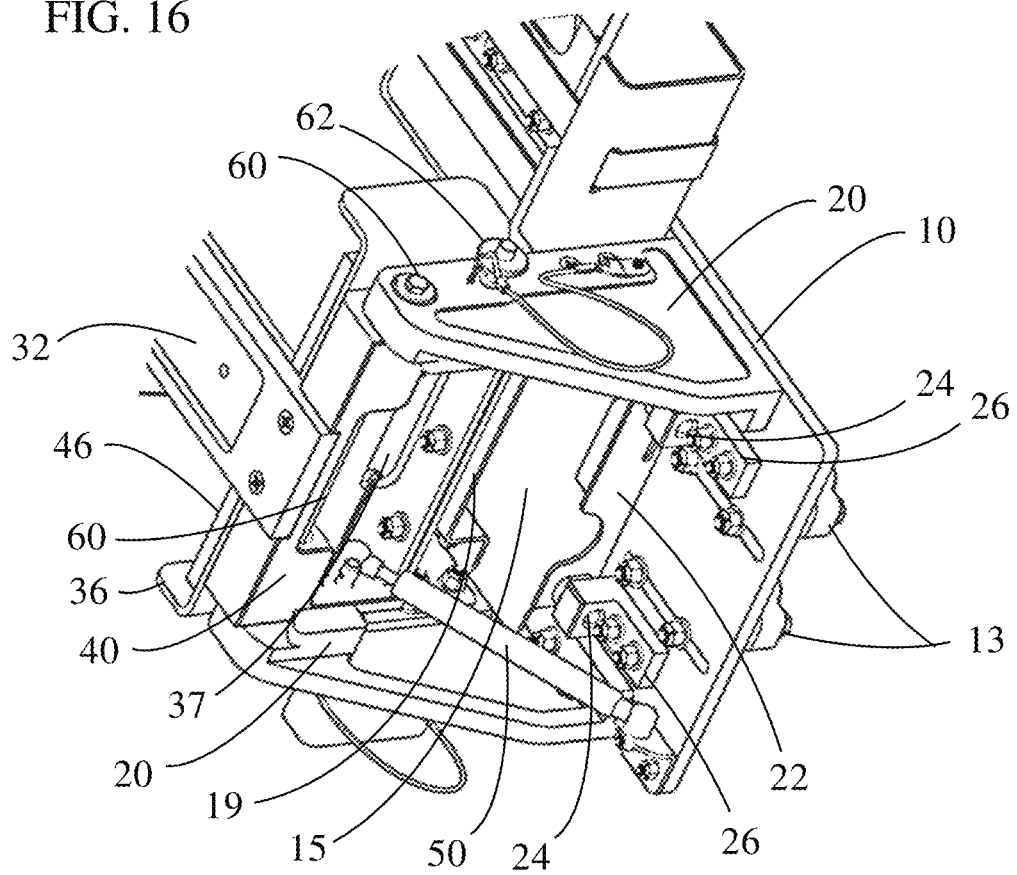
FIG. 17 is an enlarged partial perspective view of the bottom of the support apparatus of FIG. 16 taken inside the circle A.
Figure 20:
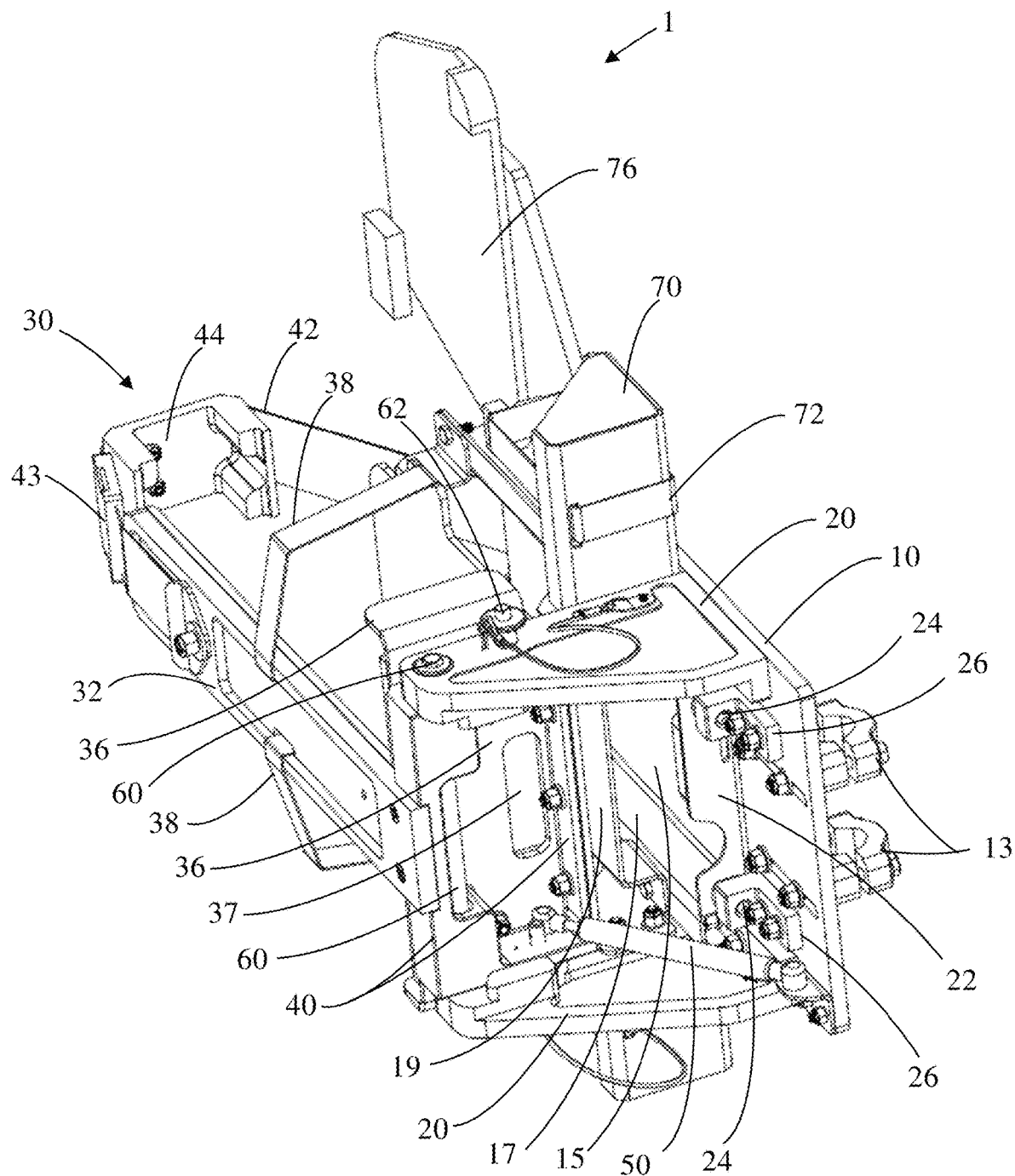
FIG. 20 is a bottom right front perspective view of the support apparatus of FIG. 1.

In one aspect, as shown in FIGS. 1, 2, 5, 8B, 13 (top of tray) and 16, 17 and 20 (bottom of tray), the power supply tray 14 includes a rear member 15 adjacent to the backer plate 10. The rear member 15 is configured to couple to the backer plate 10. In one aspect, the rear member 15 includes two tabs 16 spaced apart and extending from the top end of the rear member. The tabs 16 are configured to couple to the top end of the backer plate 10. The rear member 15 further includes right and left opposing side walls 17 (one each extending from the rear member on the right side and on the left side), a bottom wall 22 extending from the rear member, and at least one brace spanning between and coupled to the right side wall 17 and to the left side wall 17. In one aspect, the at least one brace includes a top brace 18 and a bottom brace 19. Each of the right and left ends of the top and bottom braces 18, 19 are coupled on the corresponding right and left side walls 17. In one aspect, as shown in FIGS. 16, 17 and 20, the bottom wall 22 includes at least one mounting protrusion 24 coupled to an exterior surface of the bottom wall, and configured to couple to at least one mounting bracket 26 connected to the front surface of the backer plate 10. In another aspect, two mounting protrusions 24 may be included, spaced apart, and each coupled to corresponding two mounting brackets 26, as shown in the figures.

The pair of stiffening plates 20 are configured to couple to the backer plate 10 and are disposed each on opposing sides of the pivotable bracket assembly 30. The pair of stiffening plates 20 are each one attached to the front surface of the backer plate 10 near the bottom, at the opposing right and left outer edges, and are substantially aligned parallel with one another, spaced apart, as shown in FIGS. 5, 9, 16 and 20.

Figure 15:
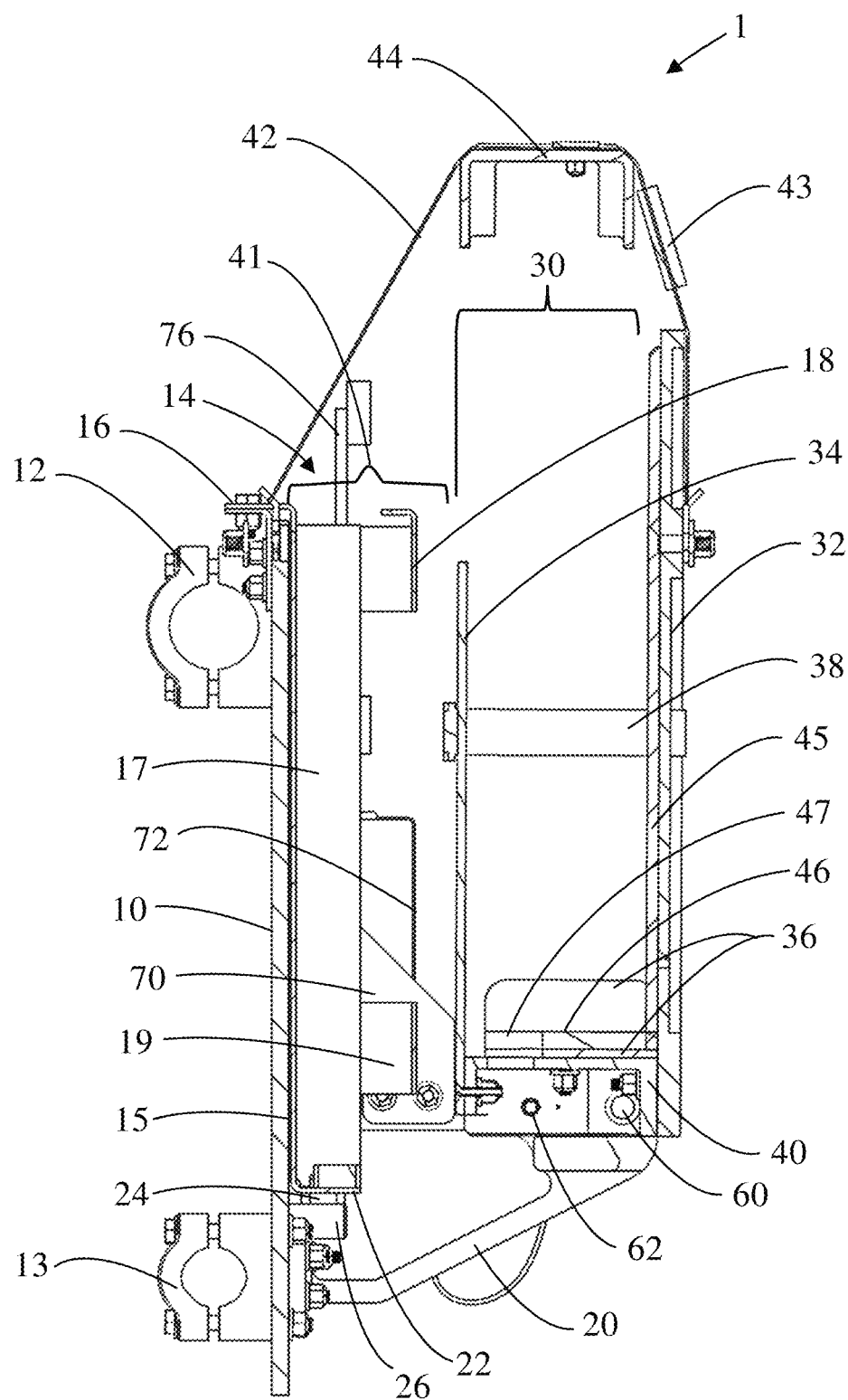
FIG. 15 is a vertical cross-sectional view of the support apparatus of FIG. 11 taken along the line A-A.

The pivotable bracket assembly 30 includes, but is not limited to, a front plate 32, a rear plate 34, a base plate 36, an intermediate brace 38, and a mounting block 40. As shown in FIG. 15, the vertical space between the rear plate 34 and the backer plate 10 forms a rear compartment 41, and the rear compartment is configured to house the power supply tray 14 and the stationary power supply 4.

Figure 19:
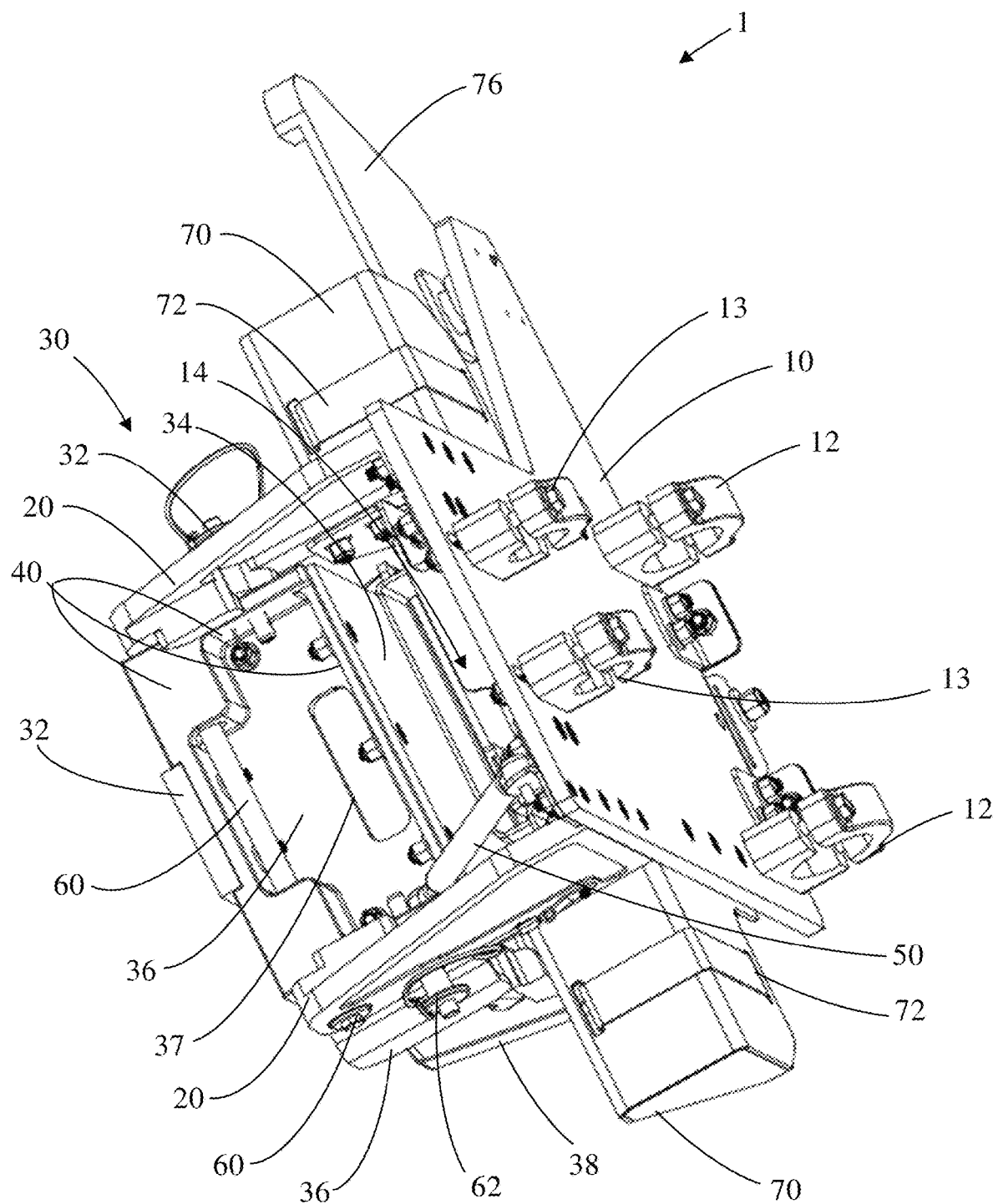
FIG. 19 is a bottom rear perspective view of the support apparatus of FIG. 1.

The mounting block 40 is preferably formed of a rigid material, and, as shown in FIGS. 19 and 20, the mounting block 40 is configured as a generally rectangular band. The mounting block 40 is disposed below the base plate 36. The right and left ends of the pivot axis rod 60 are pivotally connected to the mounting block 40 of the pivotable bracket assembly 30, and the pivot axis rod spans between and is rigidly connected to each of the two stiffening plates 20 at their front top corners. The pivot axis rod 60 is constructed of a rigid material, such as a metal alloy, and is preferably a solid cylinder. However, it is anticipated that the pivot axis rod 60 may alternatively be tubular.

Referring to FIGS. 1-3, the front plate 32, rear plate 34, base plate 36, and intermediate brace 38 provide a device storage space for storing and securing the portable electronic device 2. The pivotable bracket assembly 30 is pivotally configurable about the pivotal axis rod 60 and may be disposed in the upright vertical position, as shown in FIG. 1, or rotated forward and down to the inclined position by the user, as shown in FIG. 3.

The inclined position shown in FIG. 3 provides the user convenient access to insert as well as pick up the portable electronic device 2 from the pivotable bracket assembly 30 without having to detach the support apparatus 1 from its wearable container assembly that is exemplified in FIG. 4. The inclined position comprises a pivotal rotation of the pivotable bracket assembly 30 of approximately 60 degrees forward relative to its upright position. However, it is anticipated that the inclined position may be greater than or less than 60 degrees.

Figure 5:
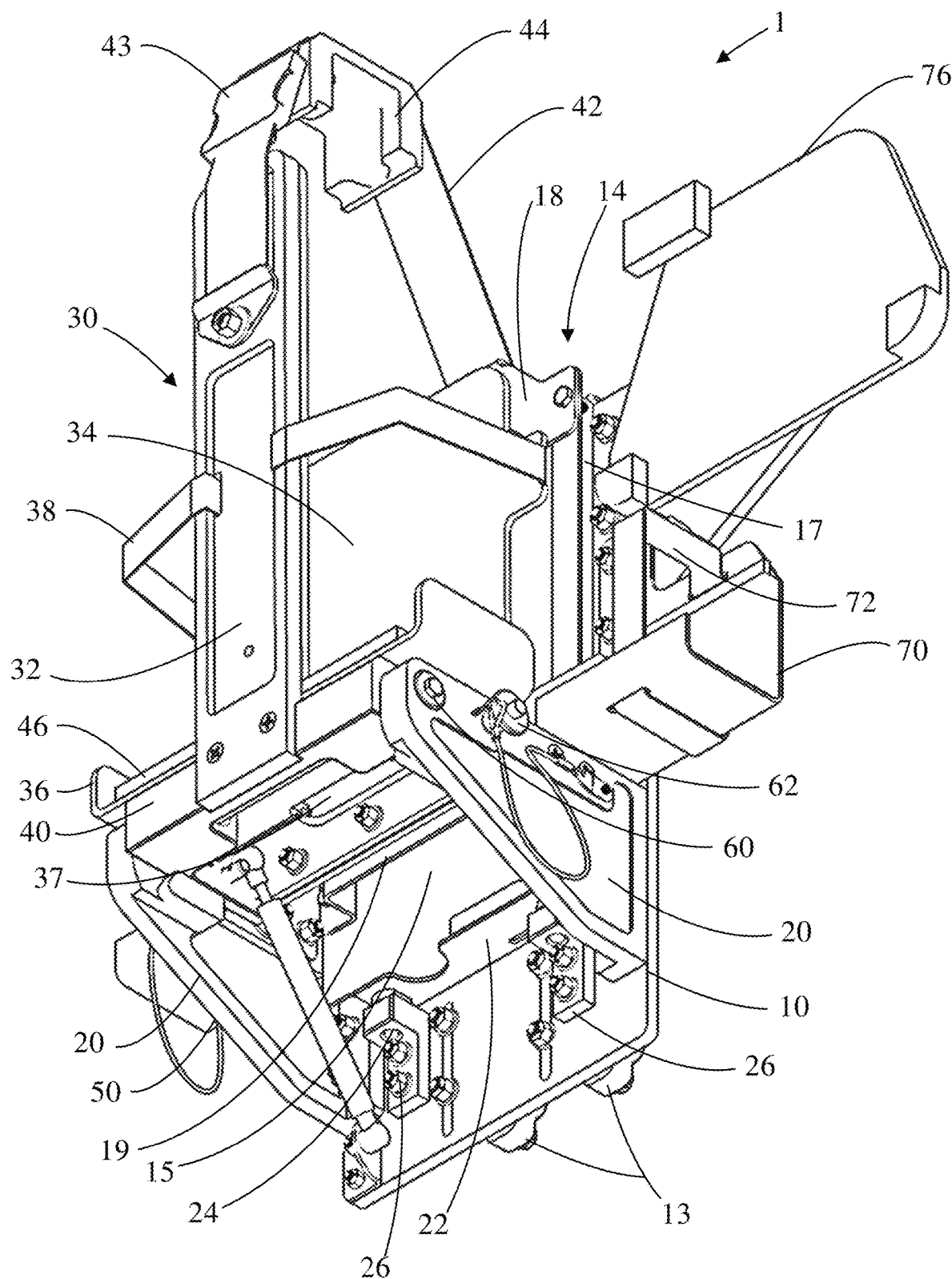
FIG. 5 is a right bottom perspective view of the support apparatus of FIG. 1.
Figure 6:
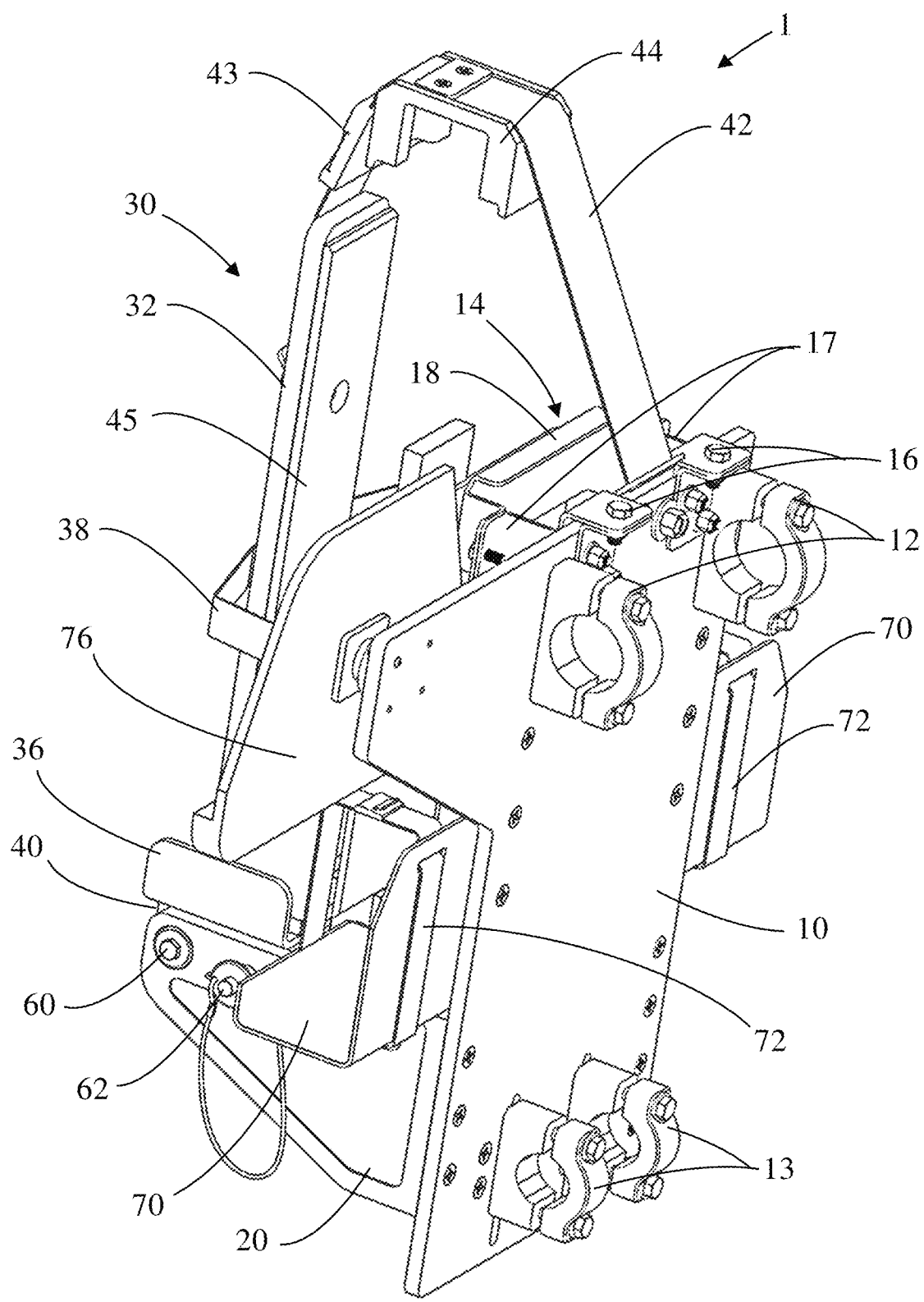
FIG. 6 is a top rear perspective view of the support apparatus of FIG. 1.
Figure 7:
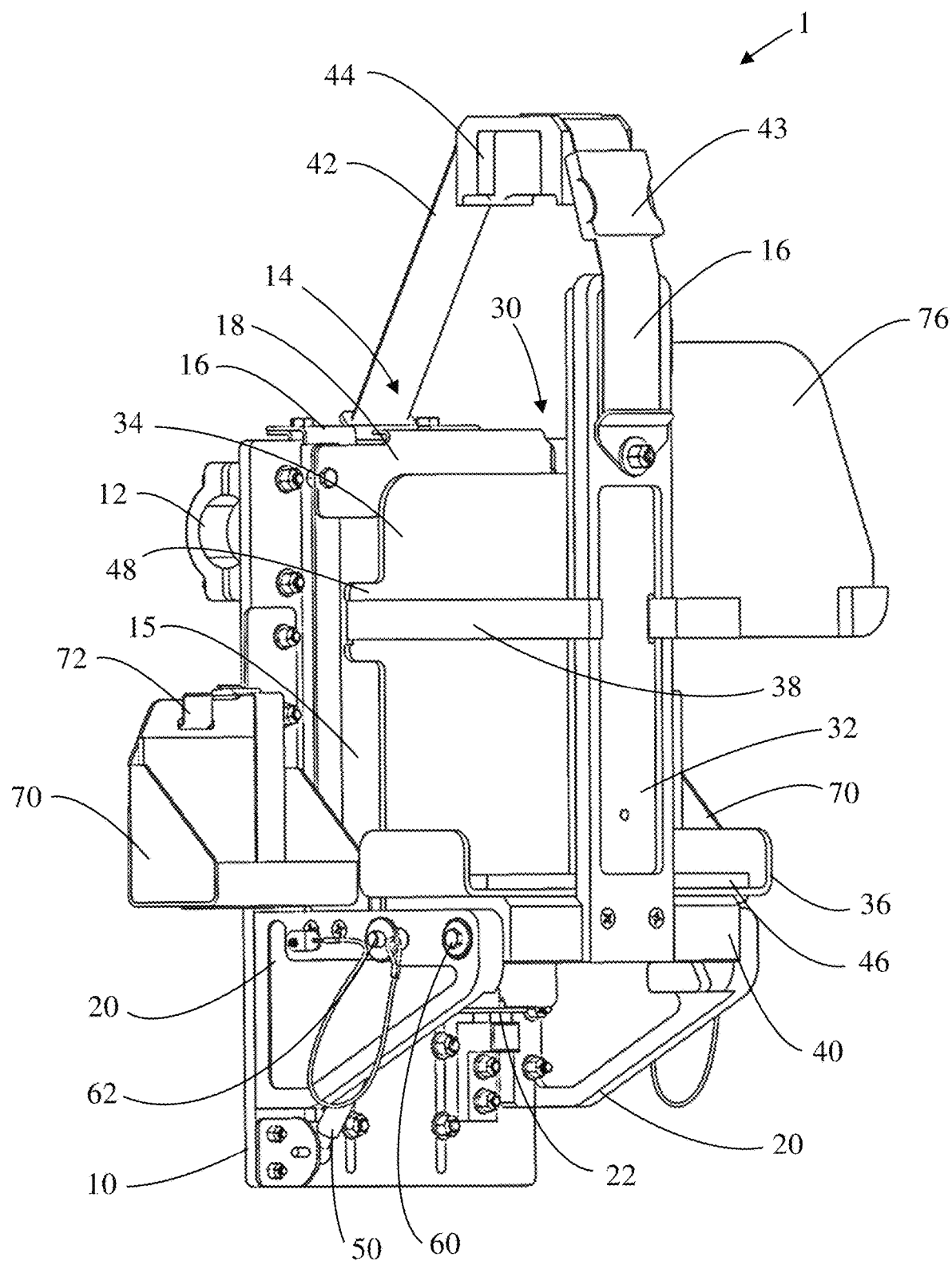
FIG. 7 is a left front perspective view of the support apparatus of FIG. 1.

The front plate 32 is configured in a substantially rectangular profile and has a top end and a bottom end. The front plate 32 is rigidly connected to the mounting block 40 near its bottom end, as shown in FIGS. 1 and 5. The front plate 32 is detachably coupled to the securement strap 42 near the top end of the front plate, and it is attached to the intermediate brace 38 in-between its top and bottom ends.

The securement strap 42 is configured to couple the front of the pivotable bracket assembly 30 to the backer plate 10 while securing the top of the portable electronic device 2. The securement strap 42 couples to and links the front plate 32 to the top of the backer plate 10 and includes a clip 43 configured for releasably fastening together the top and bottom portions of the securement strap. The top portion of the securement strap 42 includes a spacer brace 44 coupled underneath. The spacer brace 44 is configured to secure the top edges of the portable electronic device 2 (see FIG. 4) while providing a clearance access space above the central top of the portable electronic device. The securement strap 42 is configured to be adjustable, such that it can be pulled taut when installed onto the portable electronic device 2 to further restrict movement of the pivotable bracket assembly 30 when it is oriented in its upright position.

Figure 8A:
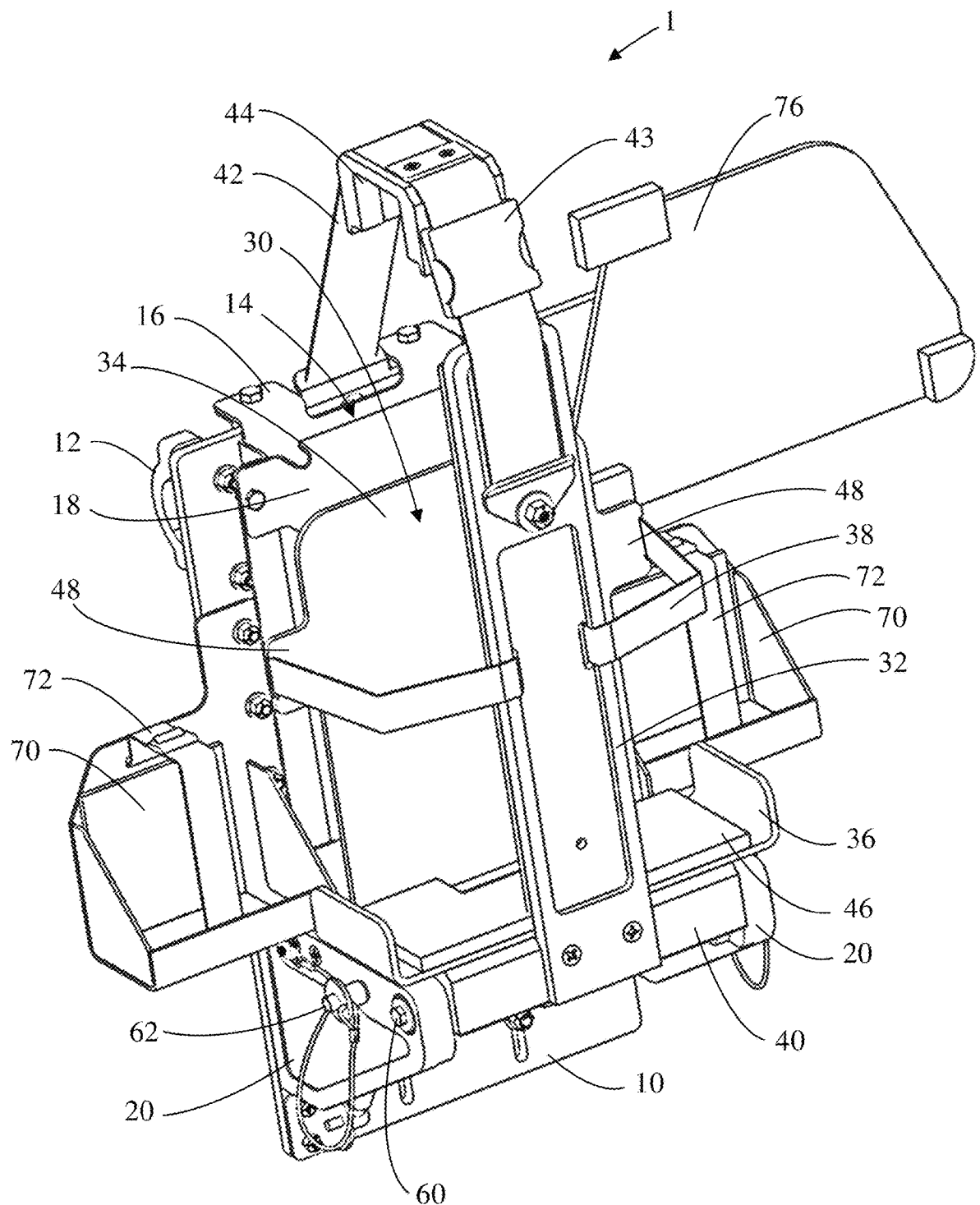
FIG. 8A is a front top left perspective view of the support apparatus of FIG. 1.
Figure 8B:
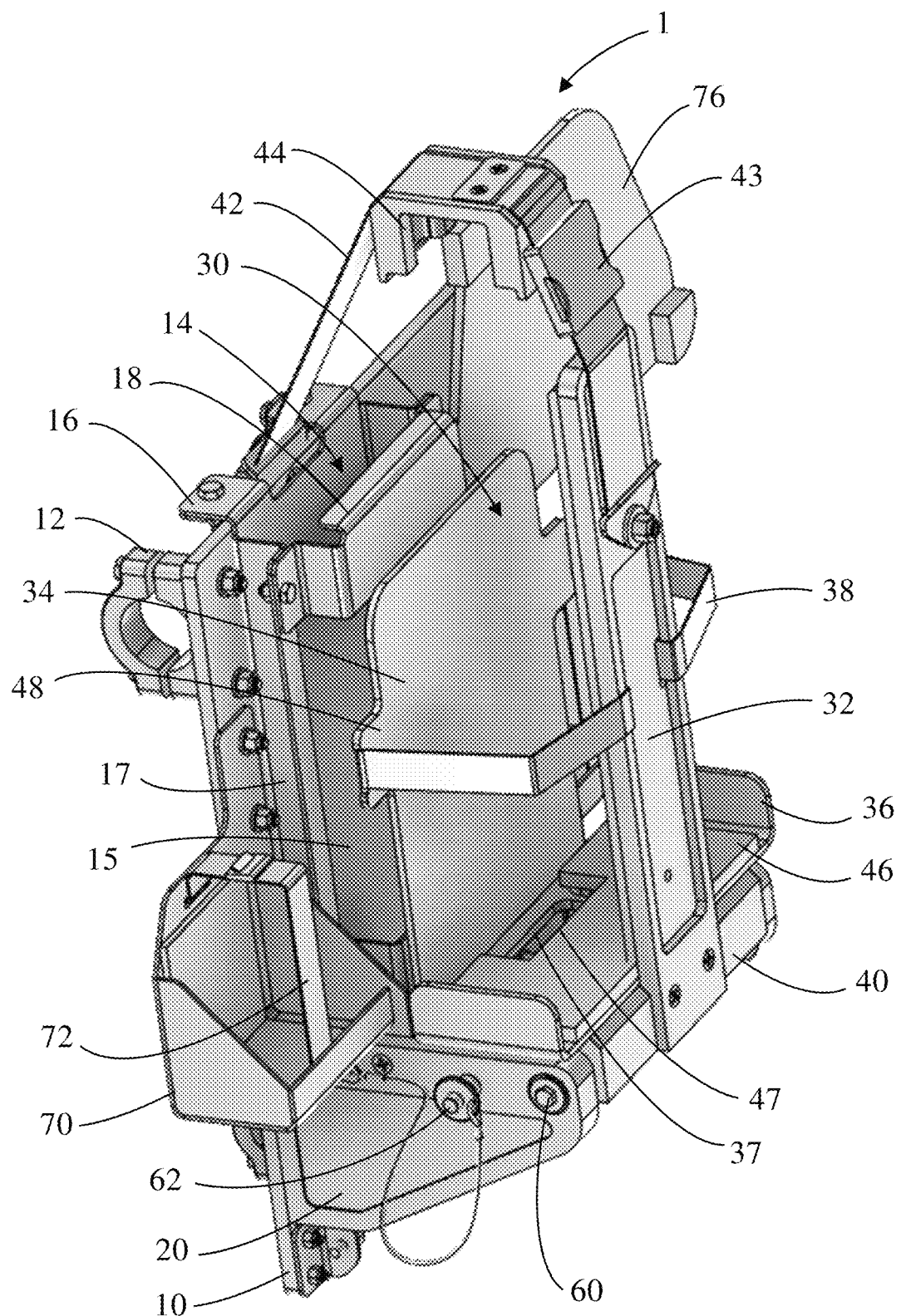
FIG. 8B is a left top front perspective view of the support apparatus of FIG. 1.
Figure 9:
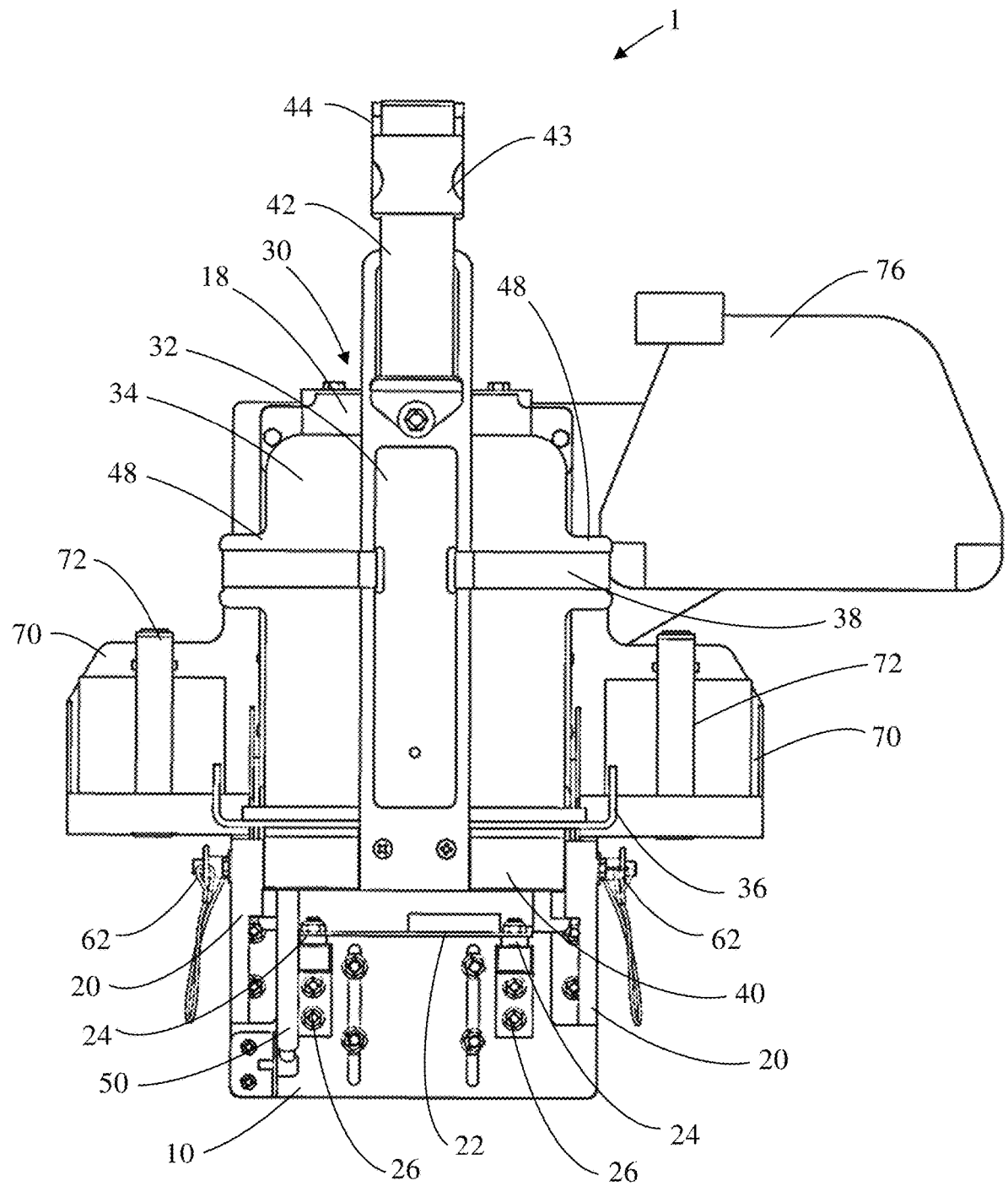
FIG. 9 is a front elevation view of the support apparatus of FIG. 1.
Figure 10:
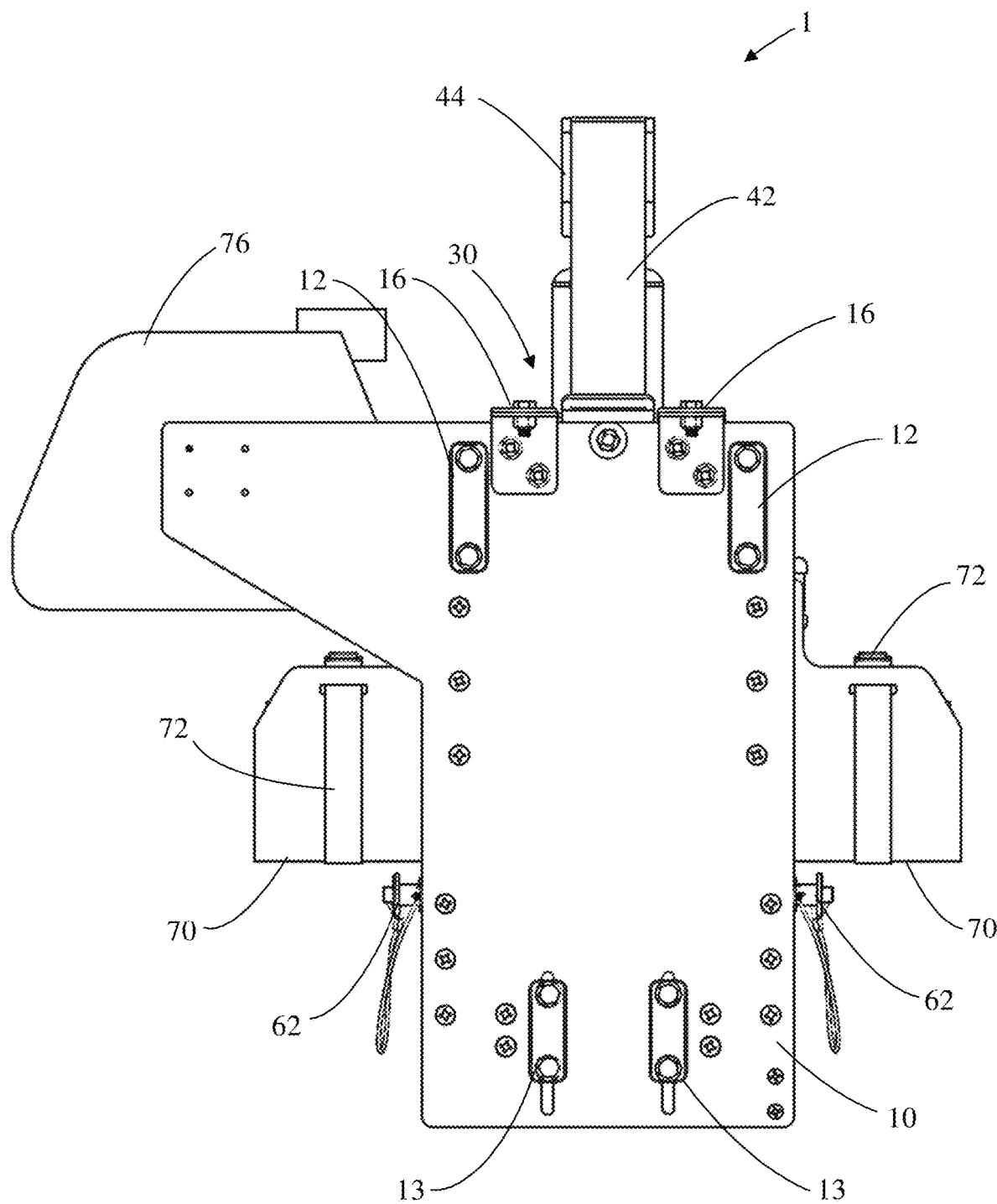
FIG. 10 is a rear elevation view of the support apparatus of FIG. 1.
Figure 11:
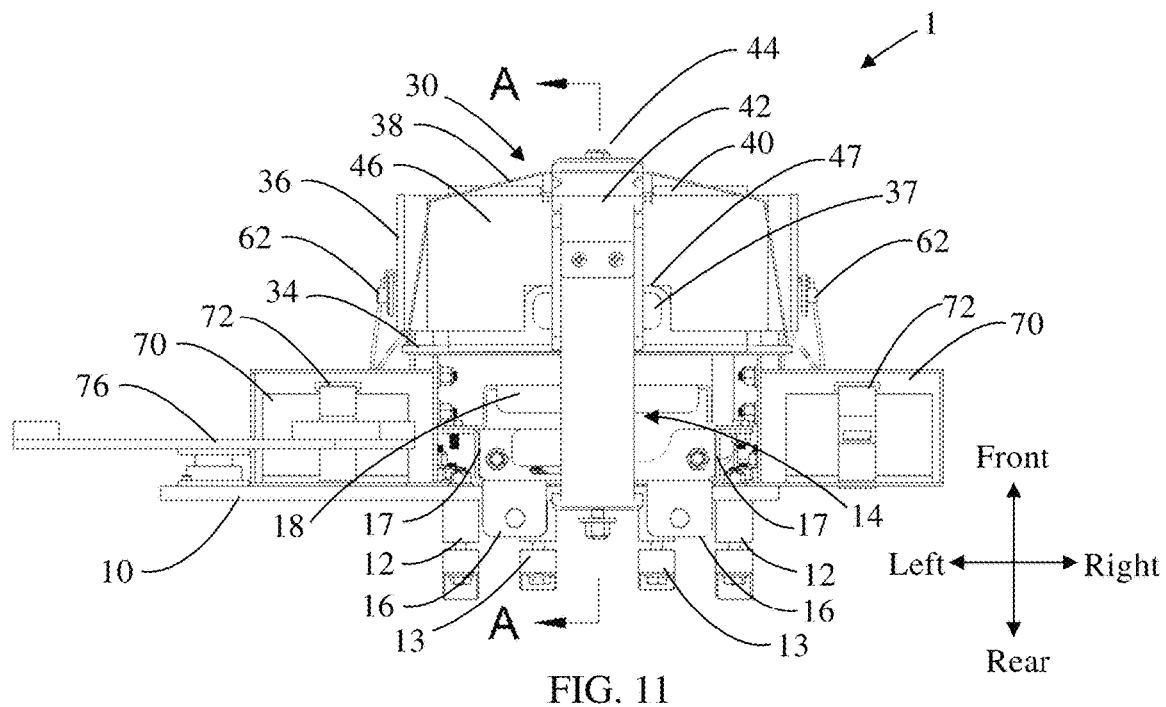
FIG. 11 is a top view of the support apparatus of FIG. 10.
Figure 12:
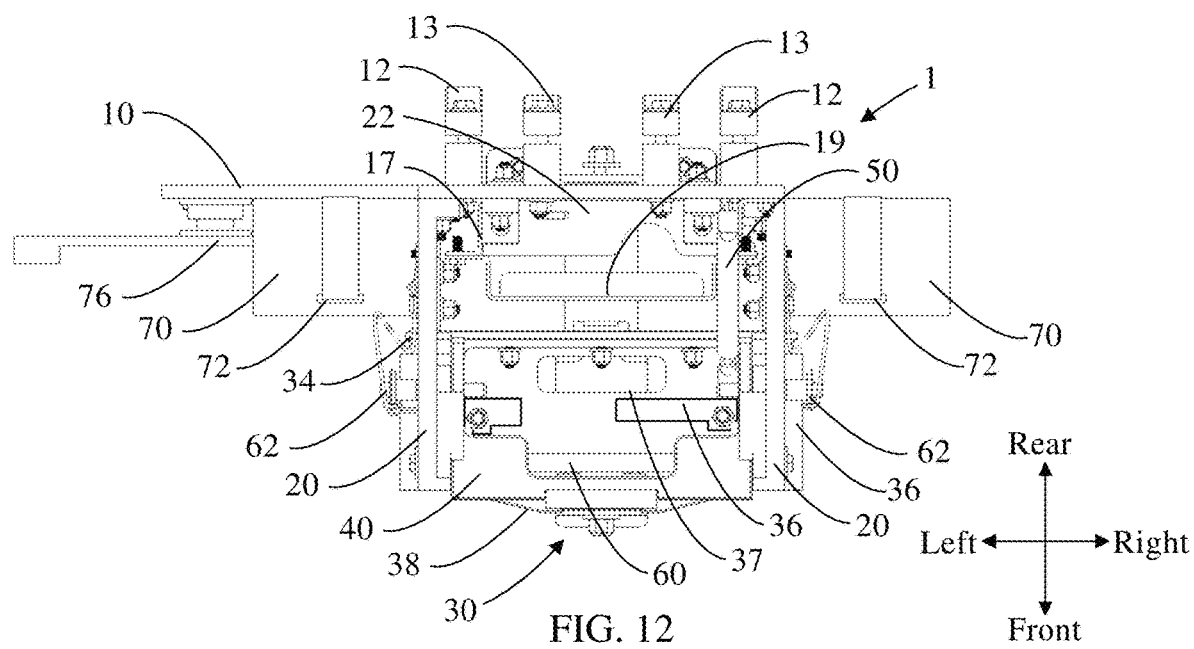
FIG. 12 is a bottom view of the support apparatus of FIG. 10.
Figure 13:
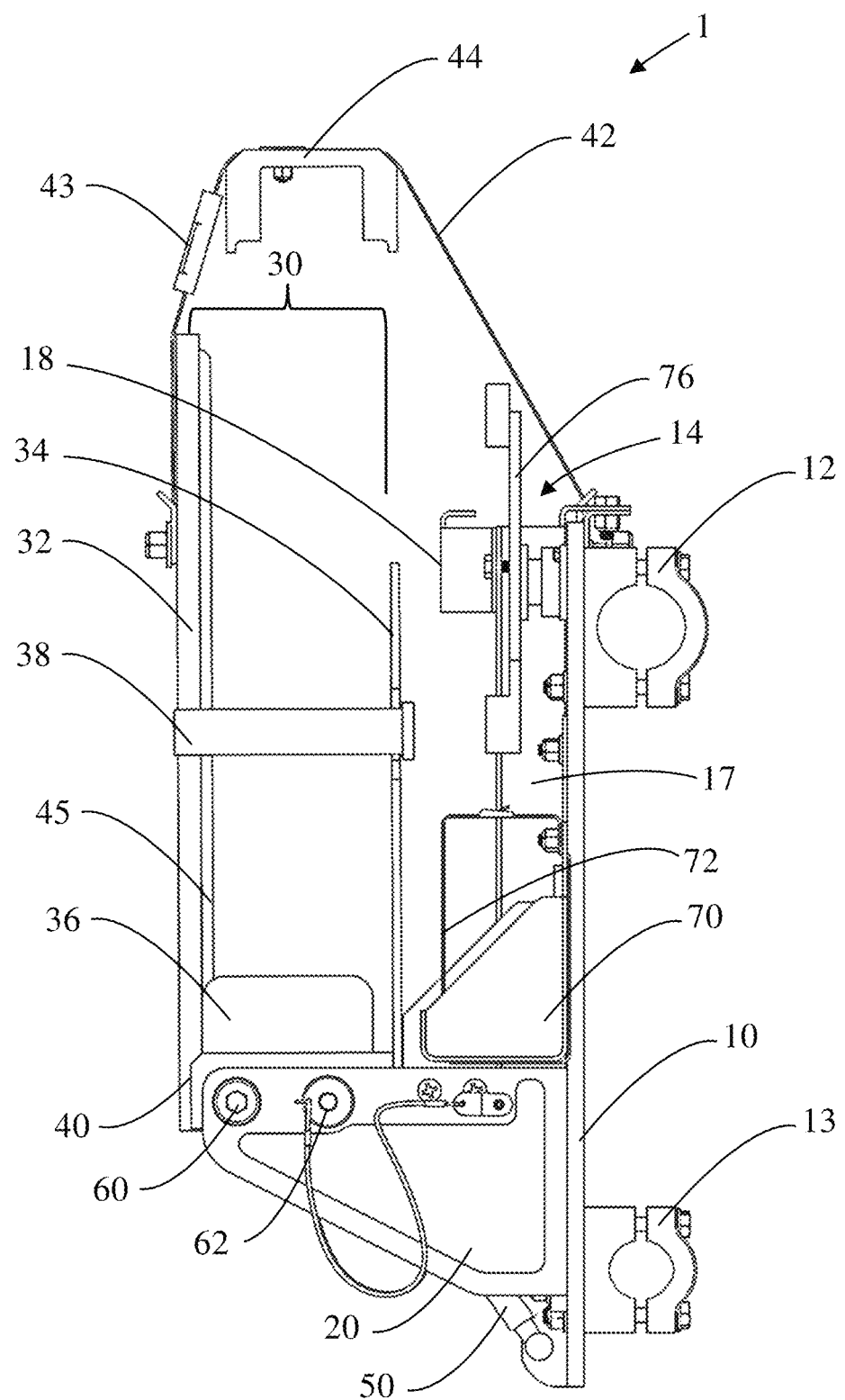
FIG. 13 is a right-side elevation view of the of the support apparatus of FIG. 1.
Figure 14:
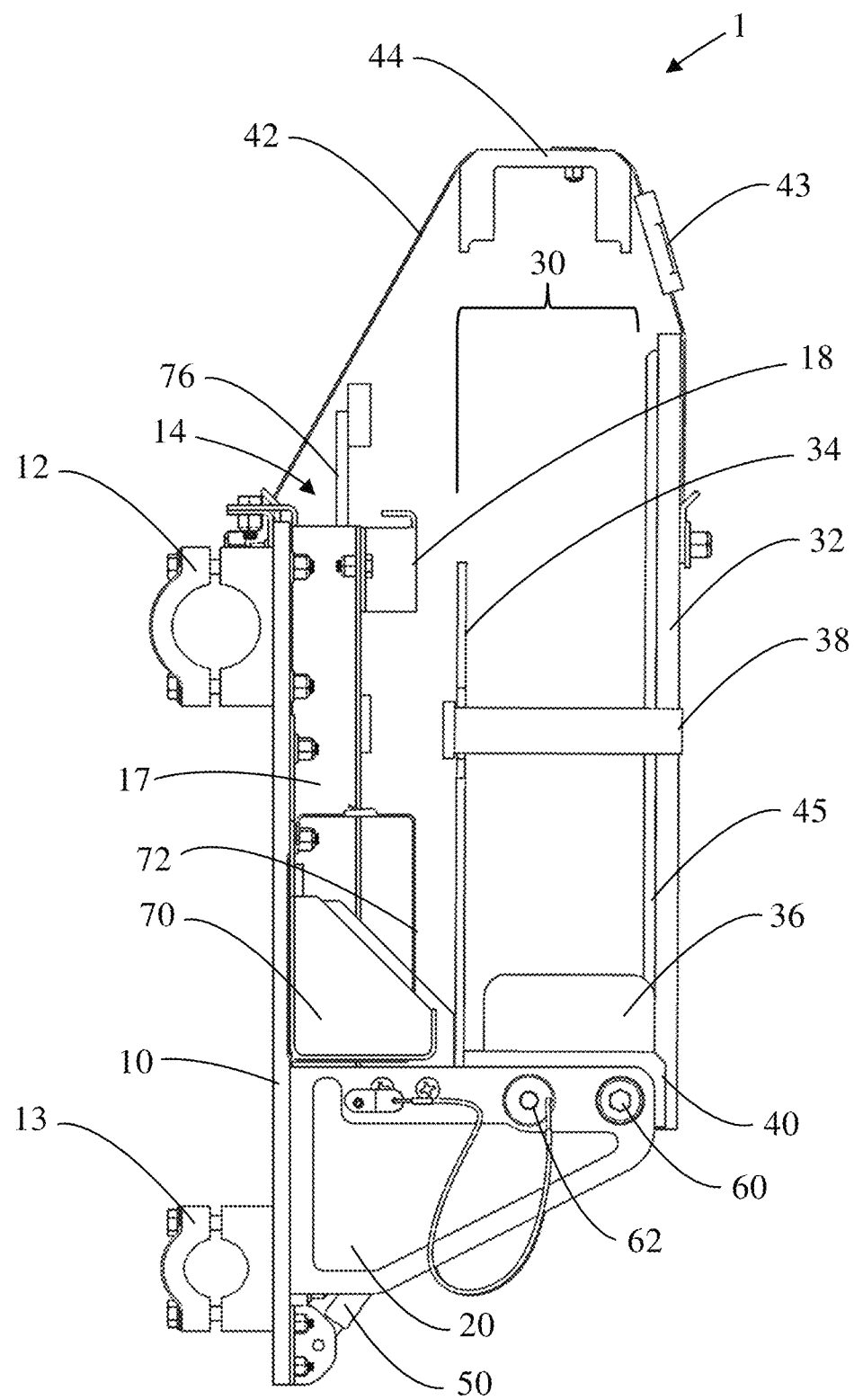
FIG. 14 is a left-side elevation view of the of the support apparatus of FIG. 1.

The intermediate brace 38 spans from the rear plate 34 to the front plate 32, as shown in FIGS. 8A and 9, and provides lateral restraint of the portable electronic device 2 (see FIG. 4). The intermediate brace 38 is preferably constructed of one or more pliable straps which are removably coupled to the front and rear plates 32, 34. However, it is also anticipated the intermediate brace 38 could, alternatively, be constructed of rigid or semi-rigid materials. In one aspect, the intermediate brace 38 is configured to be adjustable.

As shown in FIG. 15, the rear plate 34 has a top and bottom end and is rigidly connected to the rear of the mounting block 40 near its bottom end (see also FIGS. 19 and 20). The rear plate 34 is preferably oriented in a substantially parallel plane relative to the front plate 32 and is preferably rigid. Additionally, the rear plate 34 has two protrusions 48, each extending outward from opposing left and right sides, as shown in FIGS. 8A and 9. Each protrusion 48 of the two protrusions includes a notched recess which aids in positioning the intermediate brace 38 at a predetermined height.

The base plate 36 preferably includes a bent plate with a u-shaped profile, as shown in FIGS. 1 and 7-8B. The two upturned ends of the base plate 36 provide lateral support for securing the portable electronic device 2 within the pivotable bracket assembly 30. The base plate 36 includes at least one aperture 37 (see FIGS. 8A, 11, 12, 16 and 20) to provide enhanced cooling airflow passage up to the portable electronic device 2. The base plate 36 may optionally further include a bearing pad 46 coupled to the top surface of the base plate which assists in securement of the portable electronic device 2 as well as reducing the transmissibility of vibrations from the support apparatus 1 to the portable electronic device. The bearing pad 46 includes a cutout 47 (see FIGS. 8A and 11) aligned with the aperture 37 to allow unobstructed cooling airflow passage up to the portable electronic device 2. It is anticipated that a compressible pad 45 may be coupled to the rear surface of the front plate 32 as shown in FIGS. 2, 3, 6, and 13-15 to compress against the front of the portable electronic device 2 to further assist in securing the portable electronic device.

In one aspect, the mounting block 40 may additionally be mechanically linked to at least one stabilizer 50, as shown in FIGS. 5, 9, 16, 17 and 19. The stabilizer 50 may be any suitable device, such as, for example, a mechanical spring or a gas spring and is configured to stabilize the pivotable bracket assembly 30 as it rotates about the pivotal axis rod 60 by restricting/slowing the rate at which the pivotable bracket assembly is capable of rotating. In one aspect, the top end of the stabilizer 50 is pivotally connected to the interior surface of the left sidewall of the mounting block 40, and the bottom end is pivotally connected near to the bottom left of the front surface of the backer plate 10. The stabilizer 50 is configured to be axially extensible to a predetermined maximum distance under a predetermined axial load.

The locking feature 62 is configured to selectively retain the pivotable bracket assembly 30 in the upright vertical position, as shown in FIG. 1, by selectively preventing the pivotable bracket assembly from rotating about the pivotal axis rod 60 forward and down to the inclined position (as shown in FIG. 3). The locking feature 62 may be any suitable locking feature, such as, for example, pins, clamps or latches. In one aspect, the locking feature 62 includes a pair of locking pins configured to detachably couple one of the two stiffening plates 20 to a distinct side wall of the mounting block 40, as shown in FIGS. 5, 17, 19 and 20. The locking feature 62, when inserted, creates a shear plane relative to the respective stiffening plates 20 and mounting block 40 which decouples the moment resulting from the eccentricity between the center of gravity of the pivotable bracket assembly 30 and the longitudinal axis of the pivotal axis rod 60. Each locking feature 62 is preferably tethered to its respective stiffening plate 20 by a cord that is attached to the exterior surface of the respective stiffening plate 20. The user would remove each of the locking features 62 prior to rotating the pivotable bracket assembly 30 forward to the inclined position, and then re-insert each of the locking features back into the stiffening plates 20 after returning the pivotable bracket assembly back to its upright position.

Figure 18:
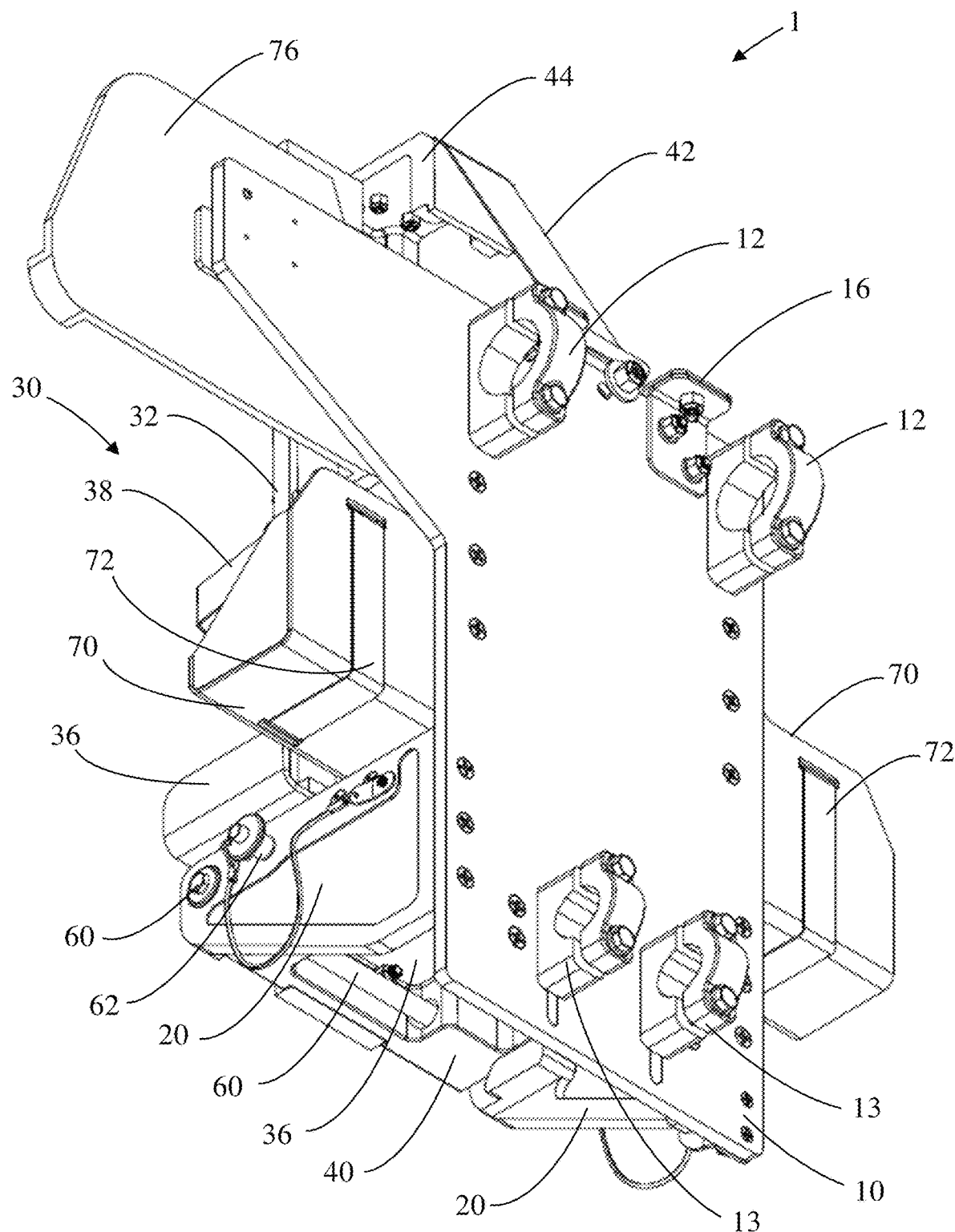
FIG. 18 is a rear right bottom perspective view of the support apparatus of FIG. 1.

As shown in FIGS. 8A, 9 and 18, the support apparatus 1 further includes a pair of auxiliary compartments 70, one of each of the auxiliary compartments being disposed on the right side and the left side of the backer plate 10. The auxiliary compartment 70 is configured with a generally basket shaped profile and includes at least one strap 72 configured for securing a supplemental power supply unit 74 (see FIG. 4). The least one strap 72 is configured to be adjustable. The supplemental power supply unit 74 may be any suitable supplemental power supply unit configured to be electrically coupled to the portable electronic device 2, such as, for example, batteries. The support apparatus 1 may optionally also include an auxiliary screen support 76 configured for securing an electronic display device 78, such as a tablet, for example (see FIG. 4). The electronic display device 78 may be configured to be electronically coupled to the portable electronic device 2. The two auxiliary compartments 70 and auxiliary screen support 76 are each rigidly coupled to the backer plate 10.

While the foregoing exemplary non-limiting embodiments of the support apparatus have been disclosed herein, certain modifications may be made by those skilled in the art to modify the embodiments without departing from the scope of the claims.

What is claimed:

1. A support apparatus for securing a portable electronic device comprising:
   backer plate comprising a front surface and a rear surface;
   a plurality of coupling devices coupled to the rear surface of the backer plate;
      wherein the plurality of coupling devices are configured for coupling the support apparatus to one or more existing structural support elements;
   a power supply tray coupled to the backer plate;
      wherein the power supply tray is configured to secure a stationary power supply which is electrically coupled to the portable electronic device;
   a pivotable bracket assembly;
      wherein the pivotable bracket assembly is configured for securing the portable electronic device, and for enabling rotation of the portable electronic device from an upright vertical position down to an inclined position;
   a pair of stiffening plates;
      wherein the stiffening plates are configured to couple to the backer plate and are disposed each on opposing sides of the pivotable bracket assembly;
   a pivot axis rod;
      wherein the pivot axis rod is configured for pivotal connection to the pivotable bracket assembly, and for rigid connection to the opposing stiffening plates;
   a locking feature;
      wherein the locking feature is configured to selectively retain the pivotable bracket assembly in the upright vertical position by selectively preventing the pivotable bracket assembly from rotating about the pivotal axis rod forward and down to the inclined position; and a securement strap;
wherein the securement strap is configured to couple a front of the pivotable bracket assembly to the backer plate while securing a top of the portable electronic device.

2. The support apparatus of claim 1, wherein the plurality of coupling devices includes at least one coupling device configured to be translationally adjustable.

3. The support apparatus of claim 1, wherein the power supply tray further includes a right side wall, a left side wall, and at least one brace spanning between and coupled to the right side wall and to the left side wall.

4. The support apparatus of claim 3, wherein the power supply tray further includes a bottom wall having at least one mounting protrusion coupled to an exterior surface of the bottom wall and configured to couple to at least one mounting bracket connected to the front surface of the backer plate.

5. The support apparatus of claim 1, wherein the pivotable bracket assembly further includes a front plate, a rear plate, a base plate, an intermediate brace, and a mounting block; wherein the mounting block is disposed below the base plate and configured to pivotally connect to the pivot axis rod.

6. The support apparatus of claim 5, wherein the base plate includes at least one aperture to provide enhanced cooling airflow passage up to the portable electronic device.

7. The support apparatus of claim 5, further comprising a stabilizer configured to mechanically link between the mounting block and the backer plate, and to restrict the rate at which the pivotable bracket assembly is rotating.

8. A support apparatus for securing a portable electronic device comprising:
backer plate comprising a front surface and a rear surface;
a plurality of coupling devices coupled to the rear surface of the backer plate;
wherein the plurality of coupling devices are configured for coupling the support apparatus to one or more existing structural support elements;
wherein the plurality of coupling devices are interchangeable depending on the geometry of the one or more existing structural support elements;
a power supply tray coupled to the backer plate;
wherein the power supply tray is configured to secure a stationary power supply which is electrically coupled to the portable electronic device;
a pivotable bracket assembly;
wherein the pivotable bracket assembly is configured for securing the portable electronic device, and for enabling rotation of the portable electronic device from an upright vertical position down to an inclined position;
a pair of stiffening plates;
wherein the stiffening plates are configured to couple to the backer plate and are disposed each on opposing sides of the pivotable bracket assembly;
a pivot axis rod;
wherein the pivot axis rod is configured for pivotal connection to the pivotable bracket assembly, and for rigid connection to the opposing stiffening plates;
a locking feature;
wherein the locking feature is configured to selectively retain the pivotable bracket assembly in the upright vertical position by selectively preventing the pivotable bracket assembly from rotating about the pivotal axis rod forward and down to the inclined position; and
a securement strap;
wherein the securement strap is adjustable and configured to couple a front of the pivotable bracket assembly to the backer plate while securing a top of the portable electronic device.

9. The support apparatus of claim 8, wherein the plurality of coupling devices includes at least one coupling device configured to be translationally adjustable.

10. The support apparatus of claim 8, further comprising a pair of auxiliary compartments; wherein each of the auxiliary compartments includes at least one strap configured for securing a supplemental power supply unit configured to be electrically coupled to the portable electronic device; and wherein each of the auxiliary compartments is rigidly coupled to a right side and to a left side of the backer plate.

11. The support apparatus of claim 8, further comprising an auxiliary screen support configured for securing an electronic display device; wherein the electronic display device is configured to be electronically coupled to the portable electronic device; and wherein the auxiliary screen support is rigidly coupled to the backer plate.

12. The support apparatus of claim 8, wherein the pivotable bracket assembly further includes a front plate, a rear plate, a base plate, an intermediate brace, and a mounting block; wherein the mounting block is disposed below the base plate and configured to pivotally connect to the pivot axis rod.

13. The support apparatus of claim 12, wherein the intermediate brace is configured to be adjustable.

14. The support apparatus of claim 12, further comprising a gas spring configured to mechanically link between the mounting block and the backer plate, and to restrict the rate at which the pivotable bracket assembly is rotating.

15. A support apparatus for securing a portable electronic device comprising:
backer plate comprising a front surface and a rear surface;
a plurality of coupling devices coupled to the rear surface of the backer plate;
wherein the plurality of coupling devices are configured for coupling the support apparatus to one or more existing structural support elements;
a power supply tray coupled to the backer plate;
wherein the power supply tray is configured to secure a stationary power supply which is electrically coupled to the portable electronic device;
a pivotable bracket assembly;
wherein the pivotable bracket assembly is configured for securing the portable electronic device, and for enabling rotation of the portable electronic device from an upright vertical position down to an inclined position;
a pair of stiffening plates;
wherein the stiffening plates are configured to couple to the backer plate and are disposed each on opposing sides of the pivotable bracket assembly;
a pivot axis rod;
wherein the pivot axis rod is configured for pivotal connection to the pivotable bracket assembly, and for rigid connection to the opposing stiffening plates;
a locking feature;
wherein the locking feature is configured to selectively retain the pivotable bracket assembly in the upright vertical position by selectively preventing the pivotable bracket assembly from rotating about the pivotal axis rod forward and down to the inclined position;

a securement strap;

wherein the securement strap is configured to couple a front of the pivotable bracket assembly to the backer plate while securing a top of the portable electronic device; and a stabilizer;

wherein the stabilizer is configured to mechanically link between the pivotable bracket assembly and the backer plate, and to restrict the rate at which the pivotable bracket assembly is rotating.

16. The support apparatus of claim 15, wherein the stabilizer is a gas spring.

17. The support apparatus of claim 15, wherein the plurality of coupling devices includes at least one coupling device configured to be translationally adjustable.

18. The support apparatus of claim 15, wherein the pivotable bracket assembly further includes a front plate, a rear plate, a base plate, an intermediate brace, and a mounting block; wherein the mounting block is disposed below the base plate and configured to pivotally connect to the pivot axis rod.

19. The support apparatus of claim 18, wherein the vertical space between the rear plate and the backer plate forms a rear compartment; wherein the rear compartment is configured to house the power supply tray and the stationary power supply.

20. The support apparatus of claim 18, wherein the power supply tray further includes a rear member, a right side wall, a left side wall, a bottom wall, and at least one brace spanning between and coupled to the right side wall and to the left side wall; and wherein the right side wall, the left side wall, and the bottom wall each extend from the rear member.

* * * * *